(12) United States Patent
Bauer et al.

(10) Patent No.: US 7,736,124 B2
(45) Date of Patent: Jun. 15, 2010

(54) DAMPER CONFIGURED TURBINE BLADE

(75) Inventors: Randall Charles Bauer, Loveland, OH (US); Gregory Terrence Garay, West Chester, OH (US); Matthew Mark Weaver, Loveland, OH (US); James Robert Bailey, Cincinnati, OH (US); Bruce Clark Busbey, Greer, SC (US)

(73) Assignee: General Electric Company, Schenectady, NY (US)

( * ) Notice: Subject to any disclaimer, the term of this patent is extended or adjusted under 35 U.S.C. 154(b) by 633 days.

(21) Appl. No.: 11/733,252

(22) Filed: Apr. 10, 2007

(65) Prior Publication Data

US 2008/0253898 A1 Oct. 16, 2008

(51) Int. Cl.
F01D 5/26 (2006.01)

(52) U.S. Cl. ............................ 415/119; 416/500

(58) Field of Classification Search .................. 415/119; 416/248, 500
See application file for complete search history.

(56) References Cited

U.S. PATENT DOCUMENTS

| 2,460,351 | A | 2/1949 | Hoffman et al. |
| 2,689,107 | A | 9/1954 | Odegaard |
| 2,809,802 | A | 10/1957 | Suits |
| 2,828,941 | A | 4/1958 | Foley |
| 2,920,868 | A | 1/1960 | Ackerman et al. |
| 2,984,453 | A | 5/1961 | Heymann |
| 3,027,138 | A | 3/1962 | Howell et al. |
| 3,973,874 | A | 8/1976 | Corsmeier et al. |
| 4,188,171 | A | 2/1980 | Baskin |
| 4,437,810 | A | 3/1984 | Pearce |
| 4,441,859 | A | 4/1984 | Sadler |
| 4,484,859 | A | 11/1984 | Pask et al. |
| 4,526,512 | A | 7/1985 | Hook |
| 5,165,860 | A * | 11/1992 | Stoner et al. ................. 416/224 |
| 5,232,344 | A | 8/1993 | El-Aini |
| 5,407,321 | A | 4/1995 | Rimkunas et al. |
| 5,820,343 | A | 10/1998 | Kraft et al. |
| 6,155,789 | A | 12/2000 | Mannava et al. |
| 6,283,707 | B1 * | 9/2001 | Chin .......................... 416/96 A |
| 6,929,451 | B2 | 8/2005 | Gregg et al. |
| 2003/0202883 | A1 * | 10/2003 | Davis et al. .................. 416/248 |
| 2005/0169754 | A1 * | 8/2005 | Surace et al. ............. 416/97 R |
| 2005/0265843 | A1 * | 12/2005 | Propheter et al. .......... 416/97 R |
| 2006/0280606 | A1 * | 12/2006 | Busbey et al. ............. 416/97 R |

OTHER PUBLICATIONS

Garay, G., "Design, Analysis, and Testing of an Internal Damper for Turbine Airfoils," 10th National Turbine HCF Conference, USA, Mar. 8, 2005, pp. 1-23.

* cited by examiner

*Primary Examiner*—Edward Look
*Assistant Examiner*—Jesse Prager
(74) *Attorney, Agent, or Firm*—William S. Andes; Francis L. Conte

(57) ABSTRACT

A turbine rotor blade includes a hollow airfoil joined to a platform and dovetail. A main flow channel extends longitudinally in span through the blade and is bound chordally by opposite partitions transversely bridging opposite sidewalls of the airfoil. A damper rib and transversely opposite damper pad are arranged together in a plurality of pairs spaced longitudinally apart in the airfoil and chordally positioned intermediate to the partitions to provide unobstructed forward and aft portions of the flow channel for channeling a coolant therethrough. The damper ribs and pads are configured to receive a wire damper through the channel to locally dampen vibration while minimizing obstruction of the coolant flow therethrough.

29 Claims, 4 Drawing Sheets

DAMPER CONFIGURED TURBINE BLADE

The U.S. Government may have certain rights in this invention pursuant to contract number N00019-04-C-0102 awarded by the U.S. Department of the Navy.

BACKGROUND OF THE INVENTION

The present invention relates generally to gas turbine engines, and, more specifically, to turbine rotor blade vibration.

In a gas turbine engine, air is pressurized in a compressor and mixed with fuel in a combustor for generating hot combustion gases. Energy is extracted from the gases in a high pressure turbine (HPT) which powers the compressor through one drive shaft, and additional energy is extracted from the gases in a low pressure turbine (LPT) which follows the HPT and drives another shaft for powering an upstream fan in a turbofan aircraft engine application.

Each turbine stage includes a stationary turbine nozzle having a row of nozzle vanes which guide the combustion gases through a corresponding row of turbine rotor blades extending radially outwardly from a supporting rotor disk. The rotor blades extract energy from the gases to rotate their supporting disks and the corresponding drive shaft connected thereto.

Each turbine blade is therefore subject to substantial aerodynamic pressure loads from the combustion gases, thermal loads from the heat thereof, and centrifugal loads from rotation of the blades atop their supporting rotating disks. The turbine blades are typically hollow in the initial turbine stages and include corresponding internal cooling circuits through which air bled from the compressor is channeled for cooling the blades from exposure to the hot combustion gases.

Each turbine rotor blade is therefore highly loaded during operation and is subject to vibration therefrom. Vibration occurs at distinct modes subject to excitation frequency and force and affects the high cycle fatigue (HCF) life of the rotor blades.

Accordingly, turbine rotor blades are specifically designed for their specific turbine stages and specific operating environment to minimize vibration at the different modes of vibration, and correspondingly maximize the HCF life of the blade.

In many designs, the individual rotor blades may be sufficiently configured for acceptable HCF life without additional remedy.

In other designs, a discrete damper is used for frictionally damping vibration of the blades during operation for enhancing blade life. However, dampers are generally undesirable because they increase the number of parts required for the engine, increase weight, and increase original cost of the engine as well as maintenance costs.

Blade vibration dampers are found in various configurations including those specifically configured for being mounted external to the blade, and those specifically configured for being mounted inside the blade. The different designs require different configurations and have different advantages and disadvantages and different modes of operation except for the common use of frictional damping.

A frictional damper introduces an interface centrifugally loaded during operation for effecting frictional damping as the adjacent components experience relative motion during vibration. The energy of vibration is dissipated by the friction, which therefore reduces the magnitude of the vibration.

However, frictional damping occurs with frictional wear between the components, and the damper and the associated blade being dampened must also be suitably designed for minimizing friction wear to ensure the desired useful life of the blade and cooperating damper.

Development testing of certain turbine rotor blades indicates that under-platform dampers are not suitably effective for damping vibration under certain vibratory modes. However, internal damping may be used to more effectively dampen the experienced vibratory modes, but substantially increases the difficulty of design.

Since the typical turbine rotor blade is optimized in design for aerodynamic, thermodynamic, and mechanical performance, the redesign thereof for additional damping performance necessarily affects the original optimum design.

For example, the airfoil portion of the typical turbine blade is hollow with relatively thin sidewalls, and includes an intricate internal cooling circuit differently configured for the different heat loads experienced over the opposite pressure and suction sides thereof. The experienced heat loads vary from the airfoil leading edge which first receives the hot combustion gases to the relatively thin trailing edge over which the gases are discharged.

The airfoil pressure side is generally concave and the suction side is generally convex and effect different velocity and pressure distributions thereover between the leading and trailing edges of the airfoil and from root to tip.

The introduction of an additional damper inside the airfoil therefore affects the cooling performance of the internal cooling circuit, as well as increases the weight of the blade and the corresponding centrifugal loads and stresses generated during rotary operation of the blades atop the supporting rotor disk.

Accordingly, it is desired to provide a turbine rotor blade having an internal damper for reducing blade vibration during operation while minimizing adverse affect in the overall blade design.

BRIEF DESCRIPTION OF THE INVENTION

A turbine rotor blade includes a hollow airfoil joined to a platform and dovetail. A main flow channel extends longitudinally in span through the blade and is bound chordally by opposite partitions transversely bridging opposite sidewalls of the airfoil. A damper rib and transversely opposite damper pad are arranged together in a plurality of pairs spaced longitudinally apart in the airfoil and chordally positioned intermediate the partitions to provide unobstructed forward and aft portions of the flow channel for channeling a coolant therethrough. The damper ribs and pads are configured to receive a wire damper through the channel to locally dampen vibration while minimizing obstruction of the coolant flow therethrough.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
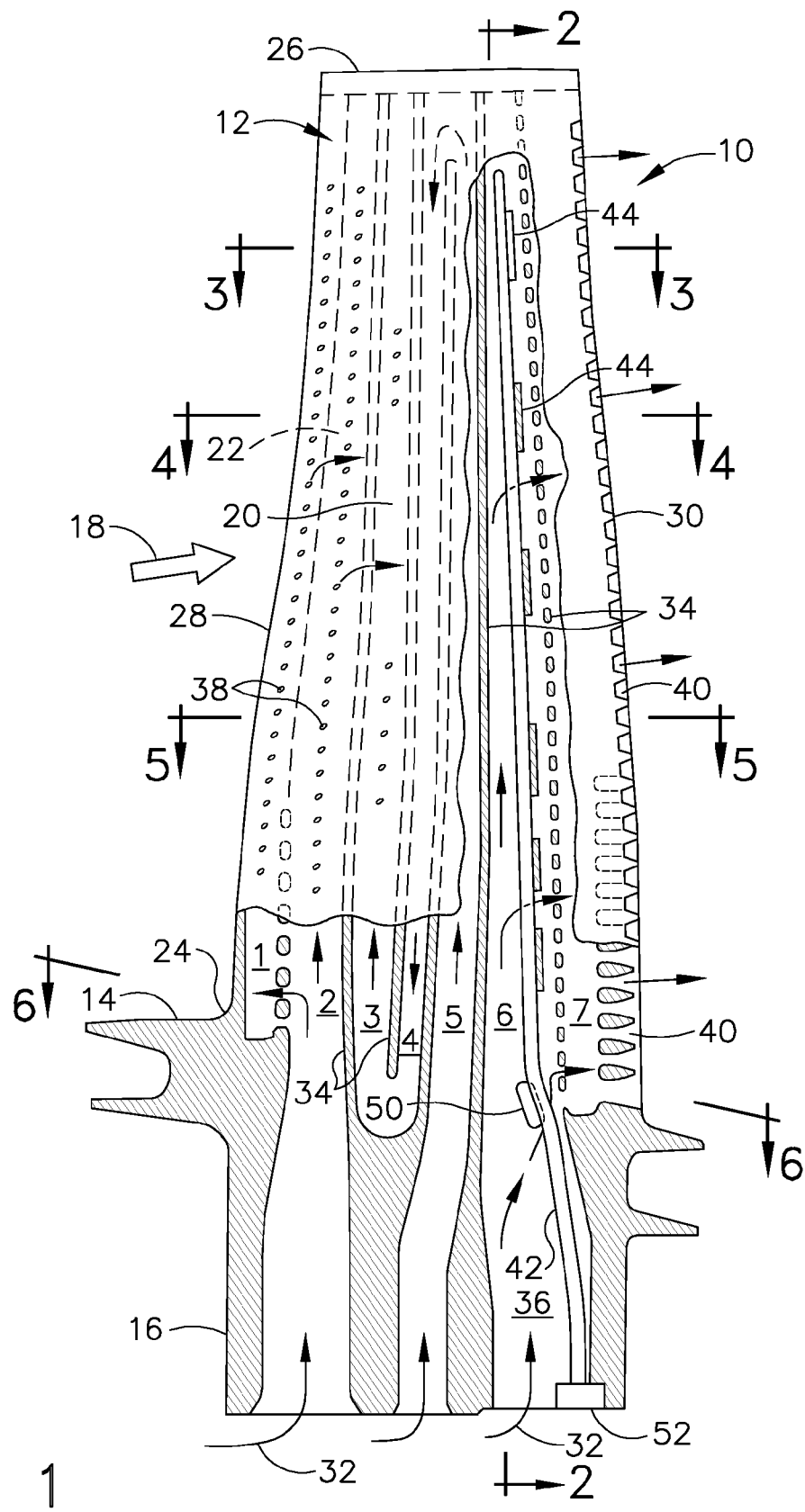
FIG. 1 is a partly sectional, radial elevational view of an exemplary gas turbine engine turbine rotor blade.

Illustrated in FIG. 1 is an exemplary turbine rotor blade 10 configured for use in a gas turbine engine for any suitable application such as in an aircraft engine, or for marine and industrial (M&I) applications. The specific blade illustrated in FIG. 1 has a relatively high aspect ratio or length for use in the LPT of the engine, although the blade is representative of any suitable turbine rotor blade including the HPT as well.

The various turbine stages in a gas turbine engine typically increase in size or radial span in succeeding, downstream stages of the engine, with the blades being shortest in the HPT and increasing in length through the LPT. The longer blades are more flexible, and therefore experience different vibratory response during operation than the shorter and more rigid HPT blades.

The basic turbine blade 10 illustrated in FIGS. 1 and 2 may have any conventional configuration except as modified hereinbelow. The blade includes an airfoil 12 integrally joined to a radially inner or lower platform 14, which in turn is integrally joined by a shank to a supporting dovetail 16. The blade is typically manufactured by casting in a unitary assembly of its parts using high strength superalloy metal.

The exemplary axial-entry dovetail 16 is specifically configured for mounting the turbine blade in a corresponding dovetail slot in the perimeter of a supporting rotor disk (not shown), with a full row of such blades being mounted to the entire perimeter of the disk for a single turbine stage.

The individual blade platforms 14 define the radially inner boundary of the flowpath, with a radially outer boundary defined by a suspended turbine shroud (not shown) between which flows hot combustion gases 18 generated in a combustor (not shown) in the engine in a conventional manner.

The airfoil 12 is hollow and includes transversely or circumferentially opposite pressure and suction sidewalls 20,22 extending longitudinally in radial span from a root 24 at the platform 14 to an opposite tip 26 at the distal end of the airfoil. The pressure sidewall is generally concave and the opposite suction sidewall is generally convex and both extend axially in chord between opposite leading and trailing edges 28,30.

During operation, the individual blade 10 extends radially outwardly from the supporting rotor disk (not shown) and extracts energy from the hot combustion gases 18. To cool the blade during operation, pressurized air 32 is suitably bled from the high pressure compressor (not shown) of the engine and used as a coolant circulated through the blade for extracting heat therefrom.

FIG. 1 illustrates an exemplary internal cooling circuit of the blade that includes a plurality of longitudinal cooling flow channels 1-7 separated chordally by corresponding longitudinal partitions 34 which transversely bridge and integrally join together the opposite pressure and suction sidewalls 20,22.

The seven cooling channels 1-7 illustrated in FIG. 1 are arranged in three distinct portions for differently cooling the different portions of the airfoil from leading to trailing edge and from root to tip.

For example, the first channel 1 is disposed immediately behind the leading edge and receives the coolant 32 from the second channel 2 disposed immediately aft therefrom, which second channel has a dedicated inlet extending through the platform and dovetail to the base thereof. The partition separating the first two channels includes a row of impingement holes which direct the coolant in impingement against the inner surface of the leading edge for enhanced cooling thereof.

The middle three channels 3,4,5 are arranged in a three-pass serpentine circuit with the airfoil fifth channel 5 including a dedicated inlet extending through the platform and dovetail to the base thereof. The coolant 32 first flows radially outwardly through the fifth channel 5 to the airfoil tip where it is redirected radially inwardly through the fourth channel 4 and flows downwardly to the platform where again it is redirected upwardly into the third channel 3 which terminates at the blade tip.

The sixth and seventh channel 6,7 are specifically configured at the aft end of the airfoil to cool the thin trailing edge region thereof. The sixth flow channel 6 extends longitudinally inwardly through the platform and dovetail and has a dedicated aperture inlet 36 in the base of the dovetail at the aft end thereof. The coolant 32 is channeled radially outwardly through the sixth channel 6 and then aft through another row of impingement cooling holes found in the partition separating the sixth and seventh channels for impingement cooling the inner surface of the seventh channel.

The airfoil includes various outlet holes through the sidewalls thereof for discharging spent cooling air from the various flow channels therein. For example, conventional film cooling holes 38 are disposed around the airfoil leading edge and pressure side for discharging spent cooling air in corresponding thin films over the external surface of the airfoil for providing thermal insulation. And, a row of trailing edge outlet holes 40 breaches the airfoil pressure side between the last or seventh flow channel 7 and terminates immediately adjacent to the thin trailing edge 30.

The turbine rotor blade so described in FIG. 1 is conventional in configuration and operation and enjoys custom cooling of the opposite pressure and suction sides from root to tip and between leading and trailing edges.

However, the otherwise conventional blade 10 is modified as described hereinbelow for specifically introducing an internal wire or stick damper 42 specifically configured for effectively damping certain vibratory modes of operation associated with the relatively long LPT blade illustrated.

Since the wire damper 42 is a discrete component, it must be suitably mounted inside the turbine blade, and increases the centrifugal loads which must be carried thereby during operation. The damper is therefore specifically introduced for maximizing damping effectiveness while minimizing adverse effects in the blade due to its additional volume and weight.

The damper 42 may be introduced into any suitable flow channel within the blade where the cooling design permits, and wherein it may have maximum damping effectiveness while minimizing adverse affect. For example, the damper 42 is preferably introduced within the sixth flow channel 6 which is the penultimate flow channel immediately before the aft seventh channel 7, which sixth channel becomes the main channel extending the full height of the blade for receiving the longitudinally elongate wire damper 42.

FIG. 1 illustrates an exemplary configuration of the damper and the main flow channel 6 in which it is mounted at the aft end of the airfoil. FIG. 2 illustrates the transverse or circumferential profile of the blade and damper in an exemplary configuration. And, FIG. 3, for example, illustrates the preferred location of the damper 42 in the radial cross section illustrated in which the airfoil has the typical crescent profile increasing quickly in width or thickness immediately aft of the leading edge 28 and then gradually decreasing in thickness to the relatively thin trailing edge portion of the airfoil terminating at the trailing edge 30.

The several partitions 34 which bound the individual flow channels along with corresponding portions of the opposite pressure and suction sidewalls 20,22 provide rigid bridges therebetween which substantially increase the rigidity of the thick forward half of the airfoil relative to the thinner and more flexible aft portion of the airfoil. Each of the intermediate flow channels 2-6 is therefore defined by a forward one of the partitions on the leading edge side of the channel, and an aft partition on the trailing edge side of the channel. And, the transversely opposite portions of the sidewalls complete the full perimeter boundary of each channel.

Figure 2:
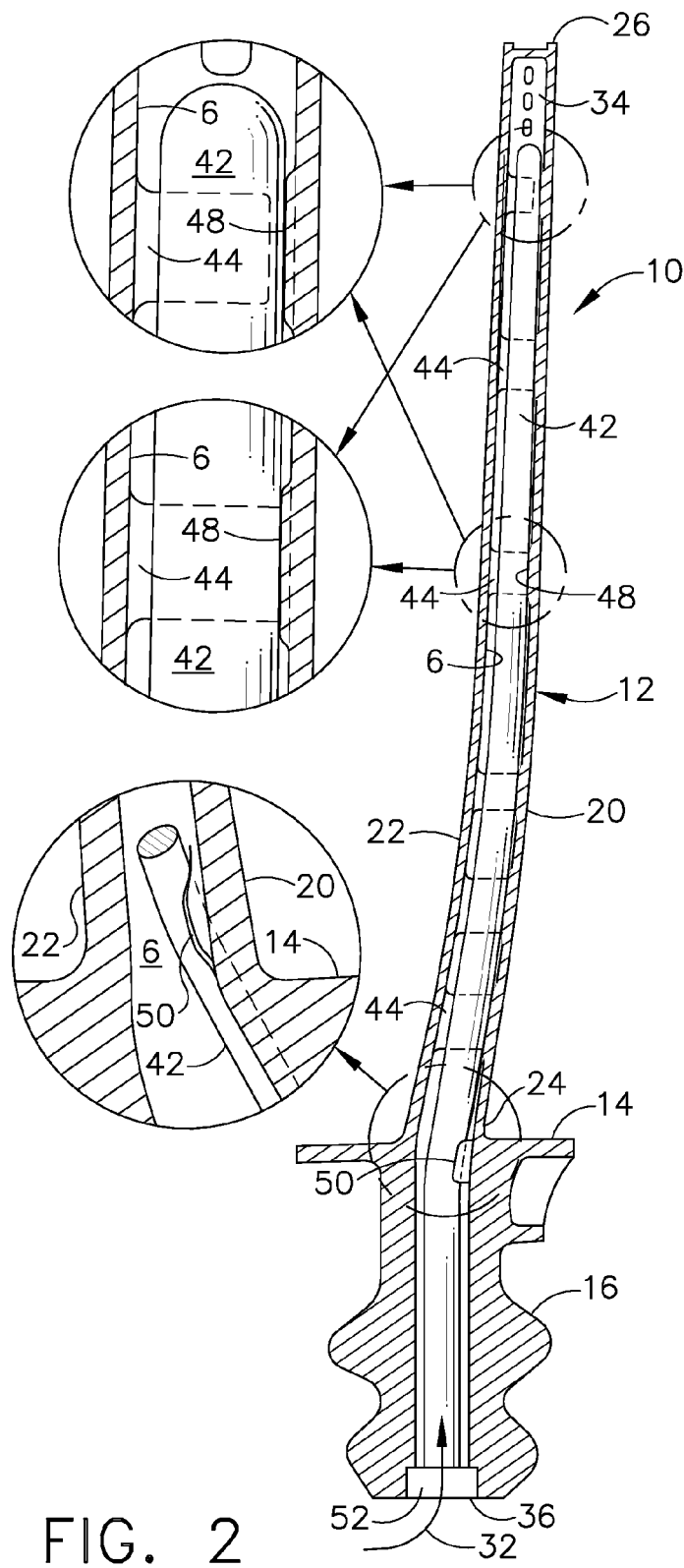
FIG. 2 is a transverse sectional view through the blade illustrated in FIG. 1 and taken along line 2-2 and facing aft toward the airfoil trailing edge.

The sixth or main flow channel 6 initially illustrated in FIGS. 1 and 2 is specifically configured for mounting the wire damper 42 therein for enhanced performance. The main channel includes a plurality of damper or catch ribs 44 spaced longitudinally apart and extending transversely between the opposite sidewalls 20,22 for chordally abutting, and thereby restraining, the damper wire 42 when mounted therein.

In the exemplary embodiment illustrated in FIGS. 1 and 2, there are six damper ribs 44 spaced longitudinally apart over the full longitudinal span of the airfoil 12 from root to tip. A relatively few number of the damper ribs 44 are provided for effecting suitable damping while minimizing flow obstructions since the damper itself inherently blocks flow of the coolant due to its new introduction in the flow channel.

Fewer or greater number of the damper ribs 44 may be provided in alternate embodiments in accordance with the length of the airfoil and the vibratory response thereof, but it is expected that the number of damper ribs will change very little, by one or two for example, from the nominal six ribs illustrated.

Figure 3:
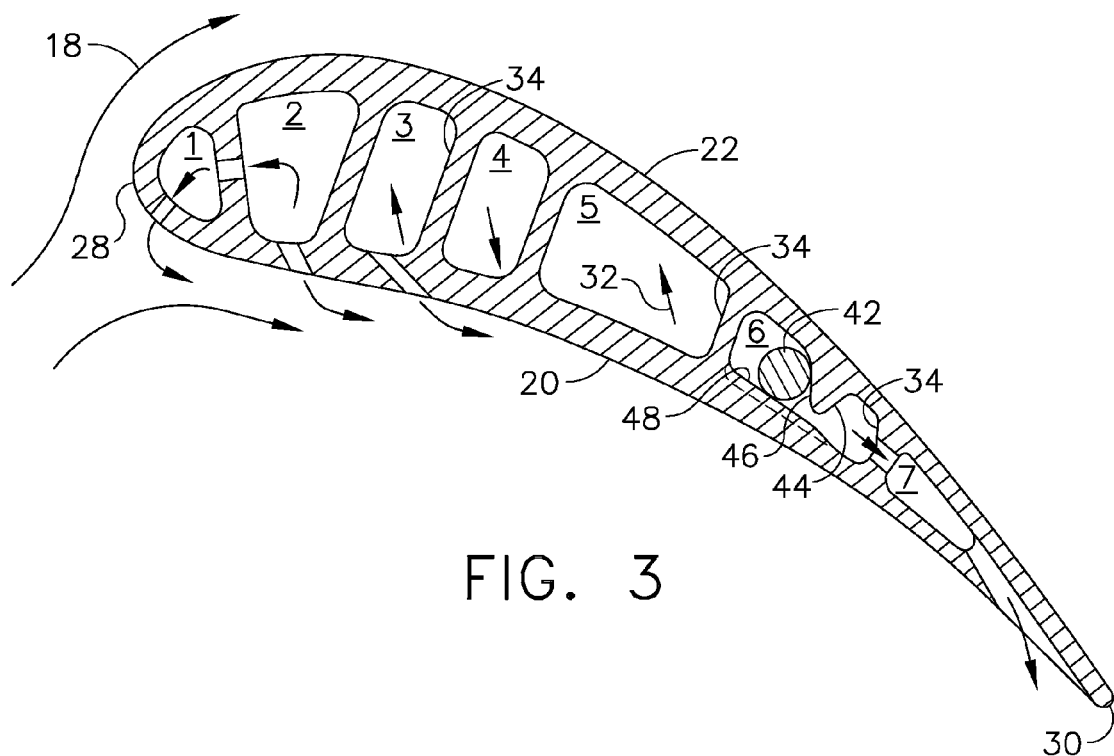
FIG. 3 is a transverse radial sectional view through the airfoil illustrated in FIG. 1 and taken along line 3-3.
Figure 4:
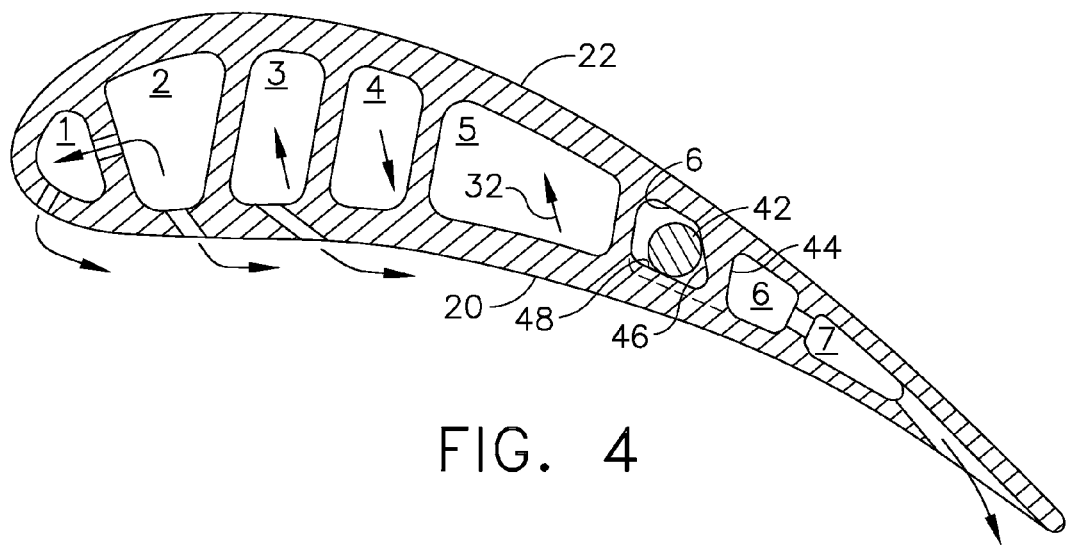
FIG. 4 is a transverse radial sectional view through the airfoil illustrated in FIG. 1 and taken along line 4-4
Figure 5:
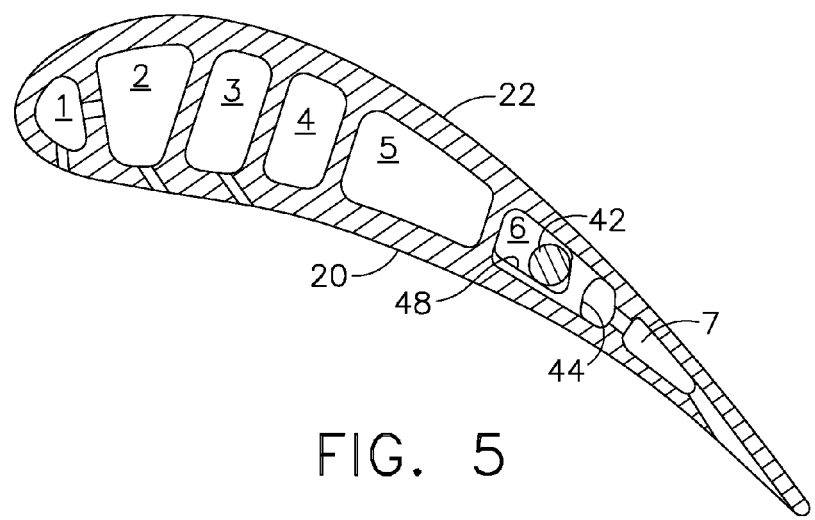
FIG. 5 is a transverse radial sectional view through the airfoil illustrated in FIG. 1 and taken along line 5-5.

FIGS. 3-5 illustrate various forms of the damper ribs 44 which commonly are inclined chordally aft between the opposite sidewalls 20,22 to provide corresponding ramps 46 upon which the damper abuts for frictionally restraining chordal movement of the damper during operation. Each ramp 46 is inclined chordally aft from the inner surface of the convex suction sidewall 22 at an included angle of about 120 degrees.

Alternatively, each ramp 46 is inclined transversely aft from the perpendicular to the inner surface of the suction sidewall by the corresponding 60 degree included angle. By either description, the damper ramp 46 converges in the aft direction as the opposite sidewalls of the airfoil converge toward the trailing edge 30 which collectively effect wedging of the damper in the aft direction between the ramp and opposite sidewall.

More specifically, each of the ramps illustrated in FIGS. 3-5 converges in the aft direction with the opposite sidewall, and extends integrally from one sidewall such as the suction sidewall 22 toward the opposite sidewall, such as the pressure sidewall 20, which opposite sidewall is locally thicker to define a cooperating thick damper rub land or pad 48 for transversely abutting the damper 44.

The opposite sidewalls 20,22 of the airfoil are initially designed for a nominal thickness in accordance with standard design practice. However, by introducing the damper 42 inside the airfoil, the local portion of the sidewall upon which the damper abuts is preferably made thicker to define the local extent of the damper pad 48.

The nominal thickness of the pressure sidewall 20 for the sixth flow channel 6 may be about 30 mils (0.76 mm) longitudinally between the rib and pad pairs, and the increased thickness thereof local to the damper pad 48 may be about 40 mils (1.0 mm). In this way, both the damper rib 44 extending inwardly from the suction sidewall and the cooperating damper pad 48 extending inwardly from the opposite pressure sidewall provide two bearing surfaces upon which the wire damper 42 is wedged during operation for maximizing damping effectiveness.

Correspondingly, the additional material provided by the damper ribs 44 and damper pads 48 permit acceptable wear of these surfaces over the lifetime of the blade without compromising strength or structural integrity of the blade itself.

As shown in FIGS. 1 and 2, the individual damper ribs 44 are longitudinally elongate, with substantially constant thickness or size. The cooperating damper pads 48 correspondingly extend both longitudinally to match the longitudinal length or extent of the cooperating damper ribs 44, and also extend chordally as shown in FIG. 3 for example to support the damper 42 transversely opposite from the respective damper ramp 46.

Accordingly, the damper ribs 44 and pads 48 are arranged together in a plurality of pairs transversely opposite to each other in the main channel 6 and spaced longitudinally apart in the airfoil 12. Each pair of damper rib 44 and pad 48 as shown in FIG. 3 is positioned chordally intermediate or between the bounding forward and aft channel partitions 34 to provide unobstructed forward and aft portions of the main flow channel 6 for channeling the coolant 32 therethrough.

The damper pads 48 and ramps 46 are preferably substantially flat and smooth over their two dimensional surface area and profile and converge together in the aft direction toward the trailing edge 30 for restraining aft movement of the damper during operation, with the centrifugal loads generated on the damper causing wedging thereof in the wedge or V-profile defined between the rib and pad.

As best shown in FIG. 1, the wire damper 42 itself is relatively straight in the airfoil 12 and has a slightly forward lean or angular orientation so that centrifugal loads acting on the damper during operation will urge the damper aft toward the trailing edge in abutting contact with the longitudinal row of damper ribs 44 which restrain the movement thereof for correspondingly effecting frictional damping due to relative vibratory motion therebetween.

In the preferred embodiment, the damper 42 is in the form of a smooth cylindrical wire for frictionally engaging the flat damper pads 48 and ramps 46 in a single line-of-contact. The damper may be made of any conventional metallic damper composition for withstanding the environment inside the metallic turbine blade, and may be formed of the same or similar superalloy metal if desired.

The damper may have a substantially constant or uniform outer diameter between its opposite ends, or may taper to small diameter as the airfoil tapers in thickness from root to tip. And, the damper may have other sectional profiles as desired for effecting damping within the specifically configured seats provided therefor inside the airfoil.

The sectional views of the airfoil and damper illustrated in FIGS. 3-5 show the centrifugal wedging of the damper chordally aft against both the damper ramps 46 and pads 48 which define the respective seats. The diameter of the damper is sufficiently smaller than the extent of the surrounding portion of the main channel 6 to permit unrestrained frictional movement of the damper in its seats, while also providing a suitable flow area for channeling the coolant 32 longitudinally around the damper.

Since the line-of-contact of the damper in its seats also provides an effective fluid seal thereat, those seats are suitably separated longitudinally as shown in FIGS. 1 and 2 to allow the coolant to also freely flow chordally around the damper within the available flow area inside the main channel 6. In particular, free access to the aft row of impingement holes between the sixth and seventh channels is effected for maintaining full span impingement cooling of the trailing edge region.

As indicated above, there are relatively few damper ribs 44 longitudinally spaced apart over the radial span of the airfoil to permit effective vibratory damping, while also minimizing flow obstruction within the main channel 6 due to the introduction of the damper itself along with the cooperating seats defined by the damper ribs and pads. The coolant 32 is therefore permitted to flow freely along the longitudinal span of the damper inside the main channel as well as chordally around the damper and between the several damper seats.

FIGS. 3-5 illustrate the central or intermediate location of the damper 42 and damper pads 48 within the main channel 6. The adjoining damper and pads are spaced together chordally between the opposite partitions 34 bounding the main channel 6 to provide unobstructed longitudinal flow of the coolant 32 through the main channel 6 both forward and aft of the adjoining damper and pads.

In the exemplary embodiment illustrated, the damper pads 48 are disposed aft in the main channel 6 behind the damper 42 and closer to the trailing edge 30, and are aligned longitudinally for forming a longitudinally unobstructed forward portion of the main channel 6 which not only receives the damper 42 itself, but also includes an unobstructed portion through which the coolant may flow.

Correspondingly, the intermediate location of the damper rib 44 also forms a longitudinally unobstructed aft portion of the main channel 6 for longitudinally channeling the coolant therethrough.

Since the main channel 6 has been modified to specifically include the damper and its mounting seats, the channel may be otherwise smooth without turbulators inside both sidewalls 20,22 longitudinally between the pairs of damper ribs 44 and pads 48 as well as along the longitudinal extent of the forward and aft portions of the channel to prevent obstruction of the coolant flow therethrough. But for the limited number of damper seats which locally block free flow of the coolant, the remainder of the main flow channel around the damper and the seats provides unobstructed flow of the coolant therethrough for performing the intended cooling operation of the airfoil in this local region.

In alternate embodiments, conventional turbulator ribs or pins may be used inside the main channel 6 on either sidewall, but preferably not in the radial elevations of the damper ribs and pads themselves, which remain smooth. And, the turbulators may be used in either forward or aft portions of the main channel 6 outside the damper.

In FIG. 4, one of the damper ribs 44 fully bridges or traverses the main channel 6 integrally with both sidewalls 20,22. The full rib 44 therefore locally bifurcates the main flow channel 6 into distinct forward and aft portions, and rigidly bridges together the opposite sidewalls.

In FIG. 3, one of the damper ribs 44 may partially bridge or traverse the main channel 6 integrally with one of the sidewalls, such as the suction sidewall 22, and terminates short of the other sidewall, such as the pressure sidewall 20. In this configuration the partial rib 44 partially bifurcates the main channel 6, with the rib 44 preferably extending greater than half the transverse width of the flow channel 6 to provide an effective seat for the damper.

The two forms of the damper rib 44 may be used to advantage in tuning the vibratory response of the turbine blade, controlling cooling thereof, and maintaining strength of the blade. The full bridges or ribs 44 increase airfoil rigidity while locally blocking coolant flow, whereas the partial bridges or ribs locally increase flexibility of the airfoil while reducing flow blockage.

FIGS. 1 and 2 illustrate several possible configurations of the damper ribs 44. All the ribs 44 may be full bridges for increasing the rigidity of the airfoil. Alternatively, one or more of the ribs in the upper span of the airfoil may be partial bridges for increasing the flexibility thereof.

Since the airfoil itself typically has a larger thickness near its root at the platform than near its tip, full bridge ribs are preferred in the lower span for maintaining the strength and rigidity of the airfoil, while partial bridge ribs may be used in the outer span of the airfoil where it is thinner and more flexible.

The form, size, and location of the bridges may be selected for the particular design for tuning the vibratory response thereof and minimizing vibration, while also ensuring enhanced strength of the blade for the desired HCF life.

In the exemplary embodiments illustrated in FIGS. 1 and 2, the damper ribs 44 are spaced longitudinally closer together in the lower half span of the airfoil 12 than in the upper half span thereof. The lower half span damper ribs are preferably full bridges to rigidly interconnect the opposite sidewalls and increase the strength of the lower supporting half of the airfoil. And, the upper half ribs may also be full bridges, or partial bridges as desired in the typically more flexible upper half of the airfoil.

The spacing between the upper ribs is greater than the lower ribs for maximizing the damping effectiveness of the damper in its seats. The damper is subject to various modes of vibration including torsion around its radial span, and bending both longitudinally as well as chordally, with the magnitude of vibration displacement typically increasing from root to tip. Significant damping of the airfoil may therefore be effected by the specific placement of the damper seats in the upper span of the airfoil as disclosed above.

Since a limited number of the damper ribs 44 are provided in the main channel for minimizing flow obstruction, their size should be minimized while correspondingly maximizing damping effectiveness from the damper 42.

For example, the longitudinal height of the damper ribs 44 shown in FIGS. 1 and 2 is relatively short compared with the longitudinal spacing therebetween, with the lower ribs in the thicker portion of the airfoil being disposed more closely together than the upper ribs in the thinner tip portion of the airfoil. The ribs are preferably spaced longitudinally apart in the airfoil greater than the longitudinal height of the ribs particularly in the flexible upper half span of the airfoil.

The limited number of damper ribs 44 minimizes the additional weight attributed thereto and correspondingly minimizes the centrifugal loads which must be carried by the turbine blade during operation.

The limited number of damper ribs with the substantial longitudinal spacing therebetween ensures substantially complete line-of-contact between the damper and ribs at each of the several seats for maximizing damper effectiveness during operation, with the portions of the damper between the distributed seats being freely suspended or unsupported for improving conformance of the shape of the damper with the plurality of seats therefor.

More specifically, the exemplary turbine blade illustrated in the Figures twists from root to tip of the airfoil for maximizing aerodynamic performance of the blade. Accordingly, the main channel 6 extends and twists longitudinally through the airfoil 12 from root to tip, as well as through the platform 14 and dovetail 16 down to the aperture inlet 36 in the base of the dovetail. The channel inlet 36 is originally provided for receiving the coolant 32 during operation, yet provides a convenient access hole for installing and mounting the wire damper 42 into the blade.

The damper 42 therefore correspondingly bends or twists through the main channel 6 from the inlet 36 to the tip 26 to match or conform to the twist of the main channel 6 longitudinally through the blade.

The airfoil illustrated in FIGS. 1 and 2 is cantilevered from the platform 14 and supporting dovetail 16. An integral shank joins the platform to the dovetail and controls the height or elevation of the platform 14 around the circumference of the supporting rotor disk.

The damper ribs 44 are disposed in the main channel 6 in the airfoil 12 above the platform 14 for maximizing their damping cooperation with the damper 42 itself. The lower end of the damper must therefore extend downwardly through the platform and dovetail with little if any lateral support inside the larger inlet portion of the channel.

Figure 6:
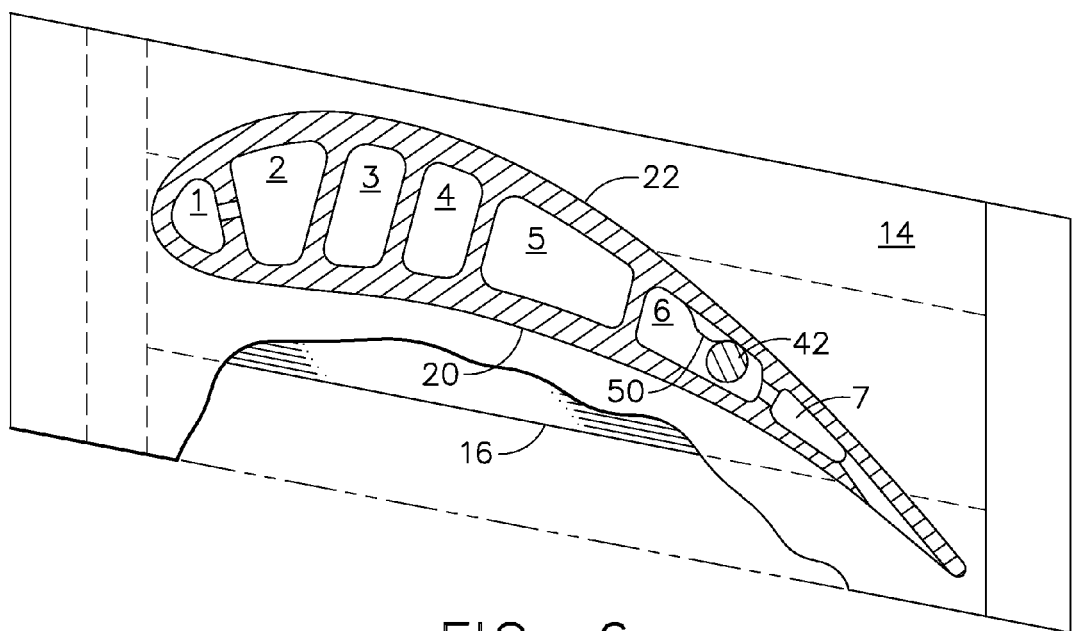
FIG. 6 is a transverse radial sectional view through the airfoil illustrated in FIG. 1 and taken along line 6-6.

Accordingly, the main channel 6 as illustrated in FIGS. 1, 2, and 6 preferably also includes a reaction pad 50 preferably disposed below the airfoil and near or at the plane of the platform 14 to chordally abut and support this lower portion of the damper in the otherwise larger main channel 6 longitudinally between the damper pads 48 and the inlet 36.

Correspondingly, the damper 42 includes an integral mounting block 52 at the proximal or lower end thereof which is fixedly mounted, by brazing, for example in the aft portion only of the common inlet 36 to the main flow channel 6 to permit flow of the coolant 32 through the channel without obstruction from the block.

The wire damper 42 itself is therefore relatively long and slender and extends longitudinally through the main channel 6 from its mounting block 52 at the inlet 36 to terminate near and short of the airfoil tip 26. The wire damper is substantially smaller in diameter than the cross sectional flow area of the main channel and is therefore relatively thin and flexible and subject to bending from the substantial centrifugal loads exerted thereon during operation in the blade.

As indicated above, the wire damper is initially introduced into the blade with a small degree of radial lean so that centrifugal loads may be exerted laterally through the damper to frictionally engage the damper in its supporting seats. The damper therefore experiences bending stresses along with the tensile stresses therein due to the centrifugal loads carried through the damper into its mounting block 52.

Since the damper 42 is otherwise unsupported between the lowest damper rib 44 in the airfoil and its mounting block 52 at the base of the dovetail, the introduction of the specifically located, small reaction pad 50 may be used to advantage for minimizing the bending stresses in this portion of the damper for extending its useful life.

By reducing the bending stresses in the damper 42 during operation, the diameter or sectional size of the damper itself may be minimized for further reducing its weight, centrifugal loads, and obstruction of the main channel flow path without compromising its damping performance.

Since the reaction pad 50 limits bending of the lower portion of the damper, it also permits the upper portion to maintain optimum contact with the damping seats defined by the ribs 44 and pads 48.

As indicated above, the damper ribs 44 chordally adjoin the aft side of the damper 42 inside the airfoil 12 in the relatively thin trailing edge portion thereof. Correspondingly, the single reaction pad 50 chordally adjoins the damper below the airfoil within the platform or shank region defining the intermediate or otherwise unsupported lower portion of the damper above its mounting block 52.

As shown in FIG. 6, the reaction pad 50 extends partially across the width of the main channel 6 integrally from the suction sidewall 22, and is located on the forward side of the damper, with the damper occupying the aft portion of the main channel 6.

In other words, the reaction pad 50 is disposed at a chordally intermediate portion of the main channel 6 between the partitions and forward of the damper 42 to correspondingly form longitudinally unobstructed forward and aft portions of the main channel, with the aft portion receiving the damper 42 in this embodiment.

The specific location of the reaction pad 50 may vary by blade design and the specific three-dimensional configuration of the main channel through which the damper is mounted. Since the airfoil typically twists from root to tip above the mounting dovetail, the corresponding flow channels 1-7 have different configurations relative to their respective inlets in the dovetail.

However, since the preferred embodiment of the damper extends from the base of the dovetail through the platform to the tip of the airfoil, the lower portion of the damper below the platform is otherwise unsupported except for the introduction of the specifically located reaction pad 50. Design analysis of the specific configuration of the blade will determine the expected bending loads in the damper, and dictate the preferred location of the reaction pad 50 for providing an intermediate support in the lower portion of the damper for reducing the bending and associated stresses therefrom.

Accordingly, effective damping may be introduced in a new design turbine blade, or retrofitted into an existing design turbine blade, by the specific introduction of the relatively simple wire damper 42 in one of the originally provided cooling flow channels. The wire damper may be otherwise conventional in configuration with a completely smooth outer surface supported over its entire length at discrete portions thereof defined at the mounting block 52, reaction pad 50, and plurality of damper ribs 44.

The wire damper may have a suitable three-dimensional (3D) configuration conforming with the 3D configuration of the main channel through which it is mounted. The damper ribs 44 and cooperating damper pads 48 are suitably aligned with each longitudinally through the airfoil for simultaneously seating the respective portions of the damper itself. The reaction pad 50 preferentially supports the lower portion of the damper between the damper pads and mounting block. And, the intermediate location of the damper seats chordally within the main channel provides unobstructed flow of the coolant in both forward and aft portions of the channel during operation.

The structural cooperation of the discrete damper seats and damper permit effective tuning of the turbine blade for minimizing vibration of specific modes of vibration of interest, without adversely affecting aerodynamic and cooling performance of the blade, and strength and life thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine blade comprising:
a hollow airfoil joined to a platform and dovetail;
a main flow channel extending longitudinally in span from an inlet in said dovetail to a tip end of said airfoil, and bound chordally by opposite forward and aft partitions transversely bridging opposite sidewalls of said airfoil; and
said main channel includes a longitudinally elongate damper rib converging aft with a transversely opposite damper pad arranged together in a plurality of pairs spaced apart longitudinally in said airfoil and chordally positioned intermediate said partitions to provide unobstructed forward and aft portions of said main channel for channeling a coolant therethrough.

2. A blade according to claim 1 wherein said damper pads conform longitudinally in size with opposite damper ribs and are locally thicker portions of said sidewalls than longitudinally between said pads.

3. A blade according to claim 2 wherein said main channel further includes a reaction pad disposed below said airfoil chordally between said partitions to continue said unobstructed forward and aft portions of said main channel.

4. A blade according to claim 3 wherein said main channel is smooth inside both sidewalls longitudinally between said damper rib and pad pairs to prevent obstruction of said coolant.

5. A blade according to claim 4 further comprising a wire damper extending longitudinally through said main channel from said inlet to terminate near said airfoil tip, and said damper ribs chordally adjoin said damper inside said airfoil, and said reaction pad chordally adjoins said damper below said airfoil.

6. A blade according to claim 5 wherein said damper pads are disposed aft in said main channel and aligned longitudinally for forming a longitudinally unobstructed forward portion of said main channel receiving said damper.

7. A blade according to claim 6 wherein one of said damper ribs fully bridges said main channel integrally with both sidewalls.

8. A blade according to claim 6 wherein:
one of said damper ribs partially bridges said main channel integrally with one sidewall and terminating short of the other sidewall; and
said reaction pad partially bridges said main channel.

9. A blade according to claim 6 wherein:
said main channel twists longitudinally through said blades;
said damper twists longitudinally through said main channel; and
said reaction pad abuts said damper longitudinally between said inlet and airfoil.

10. A blade according to claim 6 wherein:
said damper and damper pads are spaced together in said main channel chordally between opposite partitions to provide unobstructed longitudinal flow of a coolant through said main channel both forward and aft of said adjoining damper and pads;
said main channel is smooth inside both sidewalls longitudinally between said damper rib and pad pairs to prevent obstruction of said coolant; and
said damper includes a mounting block at a proximal end thereof fixedly mounted in a portion only of said inlet to permit flow of said coolant therethrough to feed said main channel.

11. A turbine blade for receiving an elongate wire damper, comprising:
an airfoil integrally joined to a platform and dovetail;
said airfoil including transversely opposite pressure and suction sidewalls extending longitudinally in span from a root at said platform to an opposite tip, and extending in chord between opposite leading and trailing edges, and further including an internal cooling circuit having a plurality of longitudinal flow channels separated chordally by corresponding partitions integrally bridging said sidewalls; and
a main one of said channels includes a plurality of longitudinally elongate damper ribs spaced longitudinally apart and inclined chordally between said sidewalls to provide substantially flat ramps for chordally abutting said damper wire.

12. A turbine blade for receiving an elongated wire damper, comprising:
an airfoil integrally joined to a platform and dovetail;
said airfoil including transversely opposite pressure and suction sidewalls extending longitudinally in span from a root at said platform to an opposite tip, and extending in chord between opposite leading and trailing edges, and further including an internal cooling circuit having a plurality of longitudinal flow channels separated chordally by corresponding partitions integrally bridging said sidewalls; and
a main one of said channels includes a plurality of damper ribs spaced longitudinally apart and extending transversely between said sidewalls, said damper ribs are inclined chordally between said sidewalls to provide ramps for chordally abutting and restraining movement of said damper wire.

13. A blade according to claim 12 wherein each of said ramps converges between said sidewalls to an opposite sidewall being locally thicker to define a damper pad for transversely abutting said damper.

14. A blade according to claim 13 wherein said damper ribs are longitudinally elongate, and said damper pads correspondingly extend both longitudinally to match said ribs and chordally to support said damper transversely oppositely from said ramps.

15. A blade according to claim 13 wherein one of said damper ribs fully bridges said main channel integrally with both sidewalls.

16. A blade according to claim 13 wherein one of said damper ribs partially bridges said main channel integrally with one sidewall and terminating short of the other sidewall.

17. A blade according to claim 12 wherein said main channel twists longitudinally through said airfoil, platform, and dovetail, and includes an inlet in the base of said dovetail for receiving said damper.

18. A blade according to claim 17 wherein said damper ribs are disposed in said main channel in said airfoil above said platform, and said main channel further includes a reaction pad disposed near said platform to chordally abut and support said damper in said main channel longitudinally between said damper pads, and said inlet.

19. A blade according to claim 18 wherein said damper pads are disposed aft in said main channel and aligned longitudinally for forming a longitudinally unobstructed forward portion of said main channel for receiving said damper.

20. A blade according to claim 19 wherein said reaction pad is disposed forward in said main channel for forming a longitudinally unobstructed aft portion of said main channel for receiving said damper.

21. A blade according to claim 18 further comprising said wire damper extending longitudinally through said main channel from said inlet to terminate near said airfoil tip, and said damper ribs chordally adjoin said damper inside said airfoil, and said reaction pad chordally adjoins said damper below said airfoil.

22. A blade according to claim 21 wherein said damper twists through said main channel from said inlet to said tip to match twist of said main channel longitudinally through said blade.

23. A blade according to claim 21 wherein said damper includes a mounting block at a proximal end thereof fixedly mounted in a portion only of said inlet to permit flow of a coolant therethrough to feed said main channel.

24. A blade according to claim 21 wherein said damper and damper pads are spaced together in said main channel chordally between opposite partitions to provide unobstructed longitudinal flow of a coolant through said main channel both forward and aft of said adjoining damper and pads.

25. A blade according to claim 24 wherein said damper ribs and pads are arranged in pairs transversely opposite to each other in said main channel, and said damper pads and ramps are substantially flat and converge aft to said trailing edge for restraining aft movement of said damper.

26. A blade according to claim 25 wherein said main channel is smooth inside both sidewalls longitudinally between said damper rib and pad pairs to prevent obstruction of said coolant.

27. A blade according to claim 25 wherein said damper comprises a cylindrical wire for frictionally engaging said flat damper pads and ramps in line-of-contact.

28. A blade according to claim 24 wherein said damper ribs are spaced longitudinally closer together in the lower half span of said airfoil than in the upper half span thereof.

29. A blade according to claim 24 wherein said plurality of damper ribs are spaced longitudinally apart in said airfoil greater than the longitudinal height of said damper ribs.

* * * * *